United States Patent
Albert et al.

(10) Patent No.: US 8,483,101 B2
(45) Date of Patent: Jul. 9, 2013

(54) SYSTEM AND METHOD FOR CASCADED TELECONFERENCING

(75) Inventors: John Albert, Kanata (CA); Thomas Gray, Mansfield (CA); Jerry Yin, Ottawa (CA); Kavita Jain, Nepean (CA); Liang Zhou, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 830 days.

(21) Appl. No.: 12/586,148

(22) Filed: Sep. 16, 2009

(65) Prior Publication Data
US 2011/0063406 A1 Mar. 17, 2011

(51) Int. Cl.
*H04Q 11/00* (2006.01)
(52) U.S. Cl.
USPC ............................. 370/266; 709/204; 709/227
(58) Field of Classification Search
None
See application file for complete search history.

(56) References Cited

U.S. PATENT DOCUMENTS

| | | | |
|---|---|---|---|
| 4,998,243 A * | 3/1991 | Kao | 370/264 |
| 5,276,678 A | 1/1994 | Hendrickson | |
| 5,548,591 A * | 8/1996 | Horikoshi | 370/260 |
| 6,363,258 B1 * | 3/2002 | Schmidt et al. | 455/514 |
| 7,006,617 B1 | 2/2006 | Dal Farra | |
| 2006/0187860 A1* | 8/2006 | Li | 370/260 |
| 2007/0067158 A1* | 3/2007 | Blocher | 704/200 |
| 2008/0165708 A1* | 7/2008 | Moore et al. | 370/260 |
| 2008/0239997 A1* | 10/2008 | Walker et al. | 370/261 |

FOREIGN PATENT DOCUMENTS

EP 0650285 * 4/1995
WO WO 03/067865 A1 8/2003

* cited by examiner

*Primary Examiner* — Brian Roberts (57) ABSTRACT

A system and method for forming a cascaded teleconference between digital telephony devices is disclosed. The method comprises selecting a plurality of digital telephony devices for a teleconference. Each digital telephony device includes a microphone, a speaker, an input port, and at least one output port. A cascaded peer to peer network is formed between the selected digital telephony devices. A sum of the local microphone signal and at least one conference microphone signal is transmitted at the output of each of the plurality of digital telephony devices. The at least one conference microphone signal is broadcast over the speaker at each of the plurality of digital telephony devices to provide the cascaded teleconference.

13 Claims, 8 Drawing Sheets

SYSTEM AND METHOD FOR CASCADED TELECONFERENCING

BACKGROUND

Modern communication and collaboration systems provide a large variety of services. These services can range from multiple forms of messaging (voicemail, email, texting, and so forth) to real time collaborations such as voice and video conferencing. These services have been widely deployed. There is a broad acceptance that they have contributed greatly to the increase in economic productivity that has been witnessed in the last thirty years. However there is a perennial issue which affects these services. The physical infrastructure that has been required to implement them has made them uneconomical for small and very small installations. Such installations can be situated in small or home office businesses or branch offices of larger enterprises. These organizations can benefit from new communication and collaboration systems but are prevented by the cost, which may not be amortized effectively across the small number of user devices in such installations.

Manufacturers of such systems have tried to address this problem for many years. Nevertheless economic and technological reality typically requires that systems designed for these small and very small installations offer fewer and different types of services than those available for larger organizations.

One alternative is to locate expensive equipment, such as dedicated telecommunications servers, at a centralized location. Users can then rent the services provided at the centralized location. The rise of networking technologies, marked by the pervasive connectivity afforded by the internet, and the availability of high-speed interconnections (multi-megabit network connections are priced at the consumer level) has led to a model of centralized network-based or hosted services being offered to small organizations.

For example, Google and its competitors offer free or very modestly priced Internet-based office applications (word processing, scheduling, Email, instant messaging) to the public including the small and very small organizations under discussion. There is also much discussion of similarly based hosted web service applications in customer relationship management, and other services of interest to small and very small organizations.

However, many organizations find the prospect of basing their telecommunications systems on externally owned technologies unattractive. When relying on external service provides, the users must depend on the providers to maintain the quality and currency of these systems. Many organizations would rather control the technology that is essential to the way they do business, rather than rely on an outside party whose interests are not their own. Many organizations consider their communication and collaboration infrastructure to be one of strategic advantage. The ability to customize and upgrade their infrastructure as the opportunity arises can enable the organization to gain a competitive advantage.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification are labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "small organization" is defined as an organization or entity that does not use a traditional PBX server and typically has less than 50 telephone lines.

As used herein, digital telephony is defined as the use of digital electronics in the provision of digital telephone services and systems using a digital telephony communications standard. Digital telephony communications standards include Voice Over Internet Protocol (VOIP) and Time Division Multiplexing (TDM) formatted for transmission over an Integrated Services Digital Network (ISDN).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The Invention

The increasing capability of microprocessors provides a means for small organizations to gain access to enhanced communication and collaboration services without the need to give over their infrastructure to an external service provider. End devices, such as digital and IP telephony devices, can be networked together over a local high-speed network and have internal processing capacity of significant size. Such devices can assume service responsibilities that previously required the provision of dedicated telecommunications servers. The management functions of a local communications network can be assumed by a digital telephony device on a peer to peer basis.

Conferencing, in various forms, is an important element of modern communication and collaboration systems. Additional features, such as paging and intercom are also of particular importance for small organizations. Traditionally, conferencing via multiple digital telephony devices has been enabled by a dedicated telecommunications server, such as a PBX server. With the capabilities of IP telephony, facilities for very small conferences (typically three party) have been provided in the telephone end point device. Thus, with IP telephony, the three party conference required for a call announcement in a supervised call transfer may be enabled by components in the telephone set. However, teleconferences for parties larger than this usually require capabilities that are only available with the use of a dedicated telecommunications server. For small installations, intercom and paging announcement systems are still an essential feature.

In accordance with an embodiment of the present invention, a system and method are disclosed whereby individual digital telephony devices may be dynamically assembled into a conferencing facility of a desired size without the need to use a dedicated PBX telecommunications server. For example, without intending to be limiting, in one embodiment of the invention a teleconference of thirty two parties may be dynamically assembled using individual digital telephony devices. The structure of these devices, their function, and the method whereby they can be dynamically assembled are described below.

A conferencing system can be created with the configuration of a peer to peer network comprising a plurality of digital telephony devices. Each device is configured to contribute its own portion of the conferencing system. The conferencing system includes two primary functions. The first function is the media processing which will create and distribute the conferencing signal itself. The second function is a management system that will enable conferences to be managed. Management of a conference call can include the ability for connections to the teleconference to be created and destroyed. Management can also include controlling the ability of each member of the conference call to contribute to the call, and management to ameliorate faults as they occur. The conferencing system can be created from combinations of these options. Thus, for purpose of clarity in exposition, these functions will be described separately.

Figure 1A:
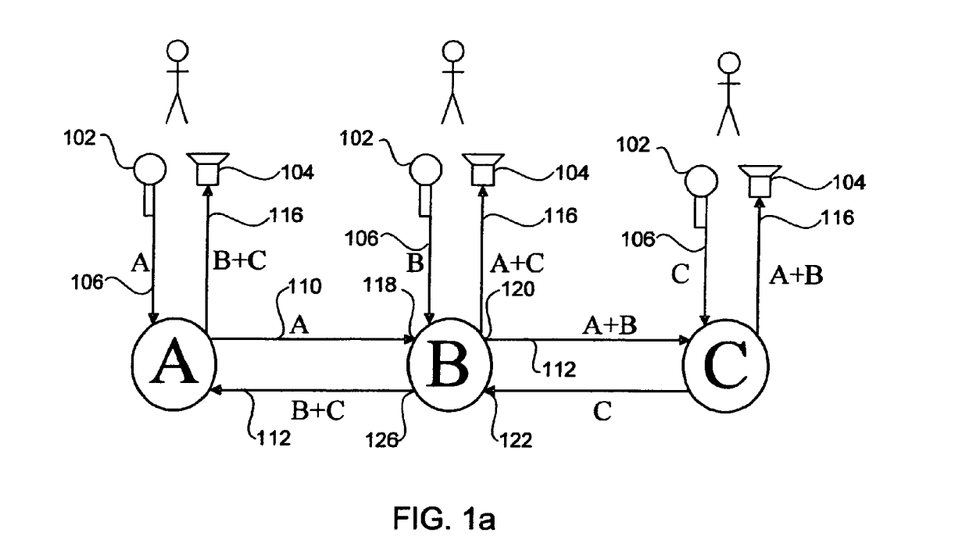
FIG. 1a is an illustration of a bidirectional cascaded digital telephony network for a teleconference in accordance with one embodiment of the present invention.

Media Processing Function
 Bi-Directional Conferencing
  In accordance with one embodiment of the present invention, FIG. 1a represents an example of a bi-directional cascaded digital telephony voice conference. In this example, there are three digital telephony devices involved in a voice teleconference. The devices are designated as A, B and C. These devices may be wired or wireless telephones, personal computers, personal digital assistants, or other types of digital telephony communication devices operable to communicate through a digital telephony communications standard such as VOIP or TDM. Each of these devices is configured with at least one microphone 102 and one or more speakers 104, which act as transducers for voice signals to and from the conferencing parties, respectively. Each device also includes at least one input port and output port. The input and output ports are designated by the lines between the devices with arrows directed into and out of the devices, respectively.

For purposes of conferencing, bi-directional connections can be set up between the parties. In accordance with one embodiment, the bidirectional connections made between each device involved in a teleconference can be made in the form of a tree. For example, FIG. 1a shows a simple case in which each of the devices in the tree has two ports. A port is an association of one input and one output in the device. The devices are linked together by ports to form a chain.

Figure 1B:
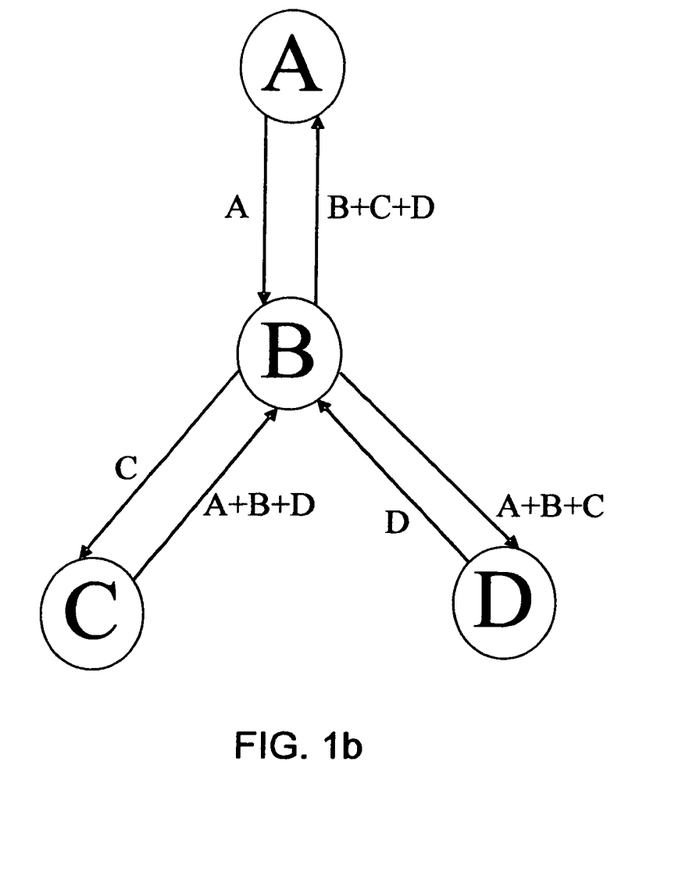
FIG. 1b is an illustration of a bidirectional cascaded digital telephony network for digital telephony devices having more than two ports in accordance with one embodiment of the present invention.

FIG. 1b shows a more complicated case in which one of the devices (device B) has three ports. In general, to form a conference, as described by this disclosure, the devices will be linked in the form of a tree. There will typically be one device at the top of the tree. Each device will be able to fan out to one or more other devices in the tree, according to the number of ports it contains. There is no fixed number of ports per device.

The conferencing signals are shown as annotations on the ports in FIGS. 1a and 1b. Each device can have its own internal signals. These will be signals received from the device's own microphone and sent to its own speaker. It will also have signals that it receives or sends on its ports. For the purpose of clarity, the output of a microphone 102 in a selected device, such as device A in FIG. 1a, is referred to as a local microphone signal 106. The output of a local microphone signal 106 added with an input signal 110 from another device, is referred to as a conference microphone signal 112. The conference microphone signal contains one or more local microphone signals from the other devices participating in the conference call that are located upstream (or downstream) from the device. The conference microphone signal can be added to throughout the cascaded network of digital telephony devices. The audio signal sent to the speaker 104 of each device typically includes the audio signal of each of the other devices in the conference call. This signal is referred to as the cascaded teleconference speaker signal 116.

In accordance with one embodiment, on its output port, each device can place the sum of its local microphone signal 106 received from its microphone 102 and the sum of all signals received on all of its input ports. This can be illustrated by device B of FIG. 1b. It receives inputs from three other devices (A, C, and D). Using its internal circuitry, it sums, for each output, its own local microphone signal B with the local microphone signals from the inputs of the other ports (A, C, and D). Thus, the output port to device D receives the signal A+B+C and that to C receives A+B+D. With this arrangement, each port in the tree will receive on its input ports, signals representing the sum of voice signals from all other devices in the tree. These may be summed and presented on the local device's speaker 104 (FIG. 1a).

Each device can receive the conference microphone signal comprising the summed local microphone signals from all other devices. For example, three devices are illustrated in FIG. 1a. However, this can be extended to any number of devices. If additional devices are added to the teleconference tree after device C, then device C will receive a conference microphone signal comprising the sum of the additional devices local microphone signals at one of the inputs of device C. The local microphone signal at device C will be added to the incoming conference microphone signal. The conference microphone signal that now includes the local microphone signal at device C will then be passed on to device B. Similarly device B, as shown in FIG. 1a, will receive the local microphone signal from device A on device B's other input port. This signal will be summed with the local microphone signal of device B to form a conference microphone signal, which will be passed on to device C, and so forth so that each device in the tree can receive the local microphone signals from each of the other devices in the tree.

Figure 2:
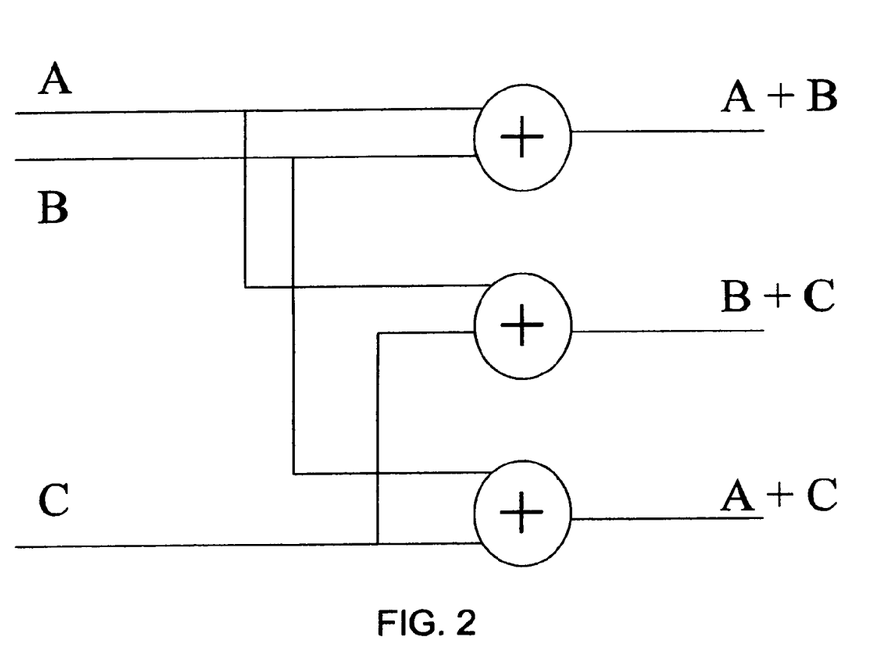
FIG. 2 is an illustration of a circuit diagram for a bidirectional cascaded digital telephony network in accordance with one embodiment of the present invention.

FIG. 2 shows an arrangement of adders that may be used for the purpose of adding the local microphone signals in the two port case, as shown in FIG. 1a. The signal annotations are those for device B in FIG. 1a. The case for devices that have more than two ports is only slightly more complicated. In general, there will be an adder for each port plus an adder for the internal speaker. So in the case of the two port devices of FIGS. 1a and 1b, there will be 3 adders. For the three port case of device B in FIG. 1b, there will be 4 adders.

Each adder associated with an output port will sum the local microphone signal plus the conference microphone signal received at the input port. For example, at the input port 118 of device B in FIG. 1a, an adder will sum the local microphone signal B 106 plus the conference microphone signal received at the input port 118. In this case, the conference microphone signal at input port 118 includes the local microphone signal A. The summed signal containing the local microphone signal from both device A and device B is output from the output port 120 from device B. Similarly, the adder associated with input port 122 will sum the local microphone signal B 106 plus the conference microphone signal received at the input port 122 including the local microphone signal C 106, and output a local microphone signal comprising local microphone signals B+C at output port 126.

The adder associated with the device's one or more speakers will sum the conference microphone signal received from each input port in the device, without adding the local microphone signal. The local microphone signal is excluded from being sent to the internal speaker since the user using the device does not need to hear his or her own voice in the speaker. In addition, feedback problems between the speaker(s) and the active microphone are significantly reduced or eliminated.

The local microphone signal from each device can be added, as shown in FIG. 2, using various digital means, as can be appreciated. For example, a digital signal processor (DSP) can be used to add the multiple audio signals into a single signal. The DSP, or a separate microchip, can also be used to disassemble a conference microphone signal containing multiple local microphone signals and convert the signal to an analog form that can be broadcast from the device's speaker(s). Other device configurations can also be used to combine the signals such as the use of dedicated circuitry implemented on an FPGA, use of discrete MSI logic gates, use of analog amplifiers as adders, use of a general purpose microprocessor, and so forth. Any means to combine and disassemble the conference microphone signals, as previously discussed, is considered to be within the scope of the present application.

With the arrangement described above, digital telephony devices having any number of ports may be mixed and matched to from a teleconference tree. Each device contributes its own internal circuitry to the formation of the conference tree. An external server is not needed to enable the conference call. In principle, conferences of any size may be created. The actual number of digital telephony devices involved in such a conference call may be limited by the number of local microphone signals that can be combined and disassembled using the DSP, or other means. A typical DSP used for this means can include 8, 16, 32, or more channels, thereby enabling 32 or more different devices to participate in a conference call without the need for a teleconference server.

Unidirectional Conferencing

Figure 3:
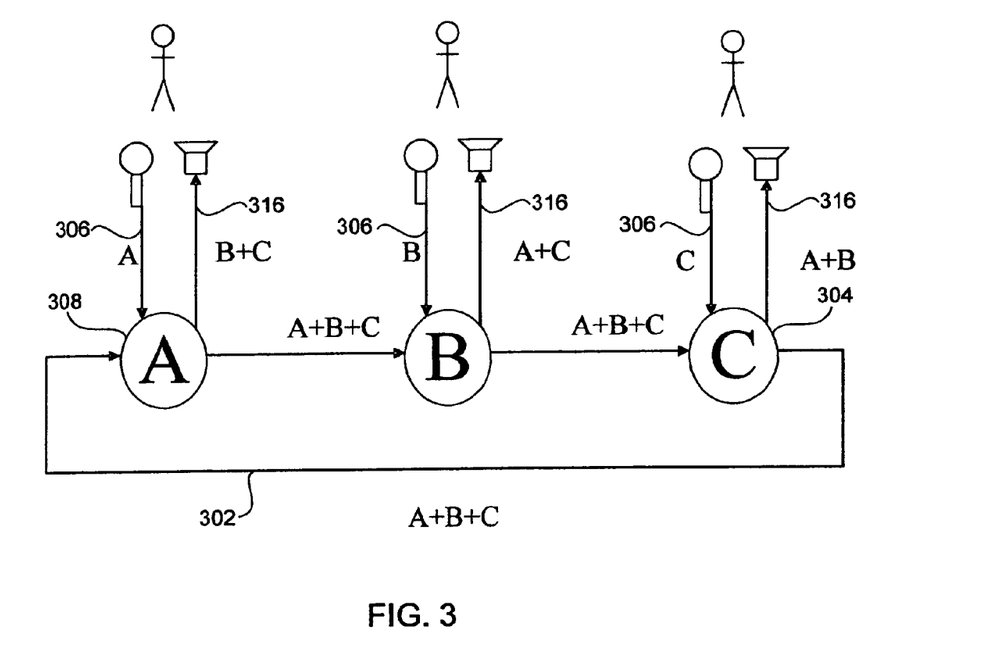
FIG. 3 is an illustration of a unidirectional cascaded digital telephony network for a teleconference in accordance with one embodiment of the present invention.

A unidirectional conference configuration is shown in FIG. 3. In a unidirectional conference configuration, a return loop 302 is formed wherein the last digital telephony device 304 in the conference call sends a conference microphone signal to the first digital telephony device 308 involved in the teleconference until a steady state is achieved after the first cycle. The return loop forms a cycle for the conference microphone signal to travel. Each device can begin transmitting and receiving on its own timing. In practice, any device can be the first or last device. Each device will receive an input from a device located upstream from it and add its own signal to the input. In the steady state, the path includes the local microphone signals of all devices included in the teleconference.

The conference microphone signal comprises one or more local microphone signals 306 from the other devices participating in the conference call. The local microphone signal is then removed at each device to form a cascaded teleconference speaker signal 316, comprising all of the local microphone signals involved in the teleconference, with the exception of the local microphone signal of each device. Intuitively, the local microphone signal 306 of each device will traverse the return loop 302 before each of the local microphone signals are included in the conference microphone signal.

Figure 4:
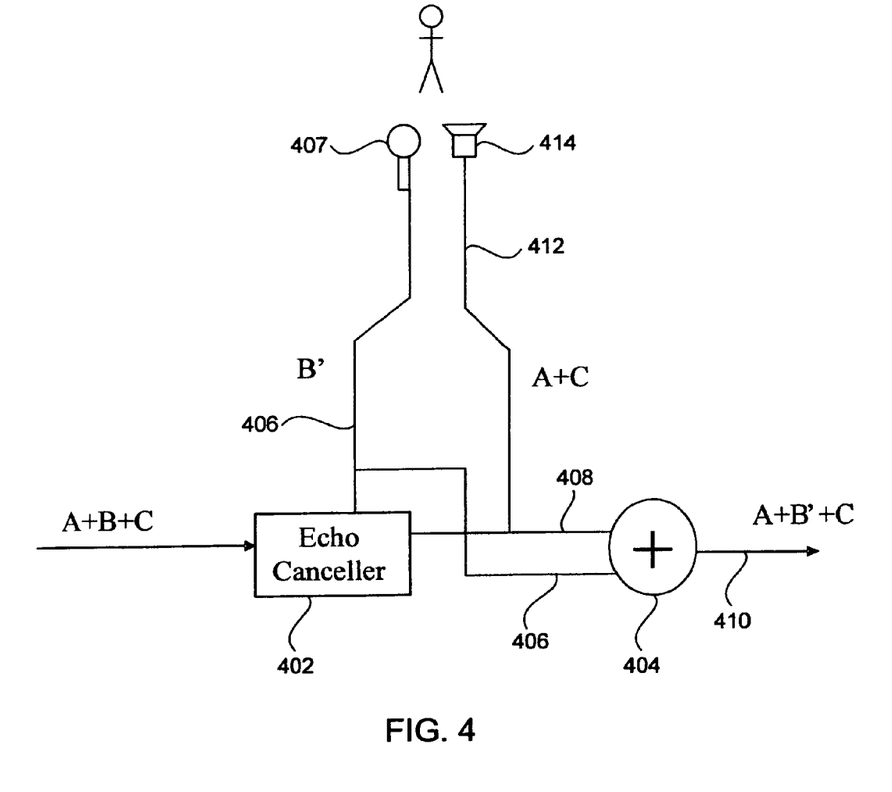
FIG. 4 is an illustration of a circuit diagram for a unidirectional cascaded digital telephony network in accordance with one embodiment of the present invention.

One embodiment of the internal conferencing circuitry for a unidirectional teleconference is shown in FIG. 4. The circuitry is illustrated with respect to device B in FIG. 3. A signal path is connected in the cycle consisting of all of the devices that are involved in a teleconference. Within each of the devices is an echo canceller 402 and an adder 404. The adder can sum the local microphone signal 406 from the device's internal microphone 407 with the conference microphone signal 408 from the echo canceller 402. The internal microphone 407 can be a microphone in a handset, a headset, one or more microphones used for teleconferencing (a hands free microphone), or another type of microphone or electronic device capable of converting audio to an electronic signal.

In operation, as shown by the combination of FIGS. 3 and 4, the adder 404 can place a sum of the signals 408 received from other devices in the teleconference, plus that of its own local microphone signal 406 to form the updated conference microphone signal 410. After the conference microphone signal has traveled through the entire cycle, all of the local microphone signals 406 from each device included in the teleconference will be included in the conference microphone signal 410.

The echo canceller 402 can remove the local microphone signal 406 from the conference microphone signal to produce a cascaded teleconference speaker signal 412 comprising the sum of the local microphone signals from all of the other devices in the teleconference, with the exception of the local microphone signal 406. The cascaded teleconference speaker signal 412 is sent to at least one speaker 414 in the device. The speaker may be a handset speaker, a conference type speaker, a headset type speaker, an earbud type speaker, or another type of speaker used to broadcast the teleconference.

In one embodiment, one or more of the digital telecommunication devices can be a standard 4 wire type device (e.g. an IP telephone) with separate lines for the microphone and speaker. In this case, the echo canceller can be quite simple. There is no issue of echo from four to two wire conversions to be dealt with. At each sampling period, the device sums its own sample of its digital local microphone signal with those of the rest of the devices and sends the sum in its output stream. This sum passes through all other devices selected for the teleconference. The amount of time for the signal to return back to a selected device provides a delay. The delay for any particular sample returning is proportional to the number of devices. In other words, if there are n devices, there will be n samples (contained in the sum) of the signal from any one device circulating at any one time in the unidirectional conference. Thus, if a device is aware of the number of devices in the conference, the echo cancellation can be accomplished by subtracting the value of the sample that is in the current input signal from digital signal (i.e. the nth sample).

Each device may be supplied with the information about the number of devices in the conference at conference set up time. This information may be kept current in all devices by the management function described later. Each device may keep a FIFO buffer of a size equal to the number of devices in the conference. As the signal passes through each device, the device will place the current signal sample in the FIFO and withdraw the delayed sample from the FIFO. This delayed sample will be the sample that has been delayed through the other devices and is now at the input. The current sample may be inverted and added to this input signal to produce the sum of the local microphone signals from all devices but the current one. This effectively provides an additional means to implement echo cancellation by removing the local microphone signal 406 from the conference microphone signal to produce a cascaded teleconference speaker signal 412.

With the unidirectional conference configuration shown in FIGS. 3 and 4, the sum of the voice signals from all devices can circulate on the cycle and each digital telephony device will be able to produce and provide to its speaker, the sum of the signals from all devices except for itself. As with the bi-directional conference configuration previously discussed, the unidirectional teleconference configuration enables a teleconference to occur between multiple digital telephony devices using only the circuitry within each of the devices. There is no requirement for any additional functions provided by an external server.

Management Function

Figure 5:
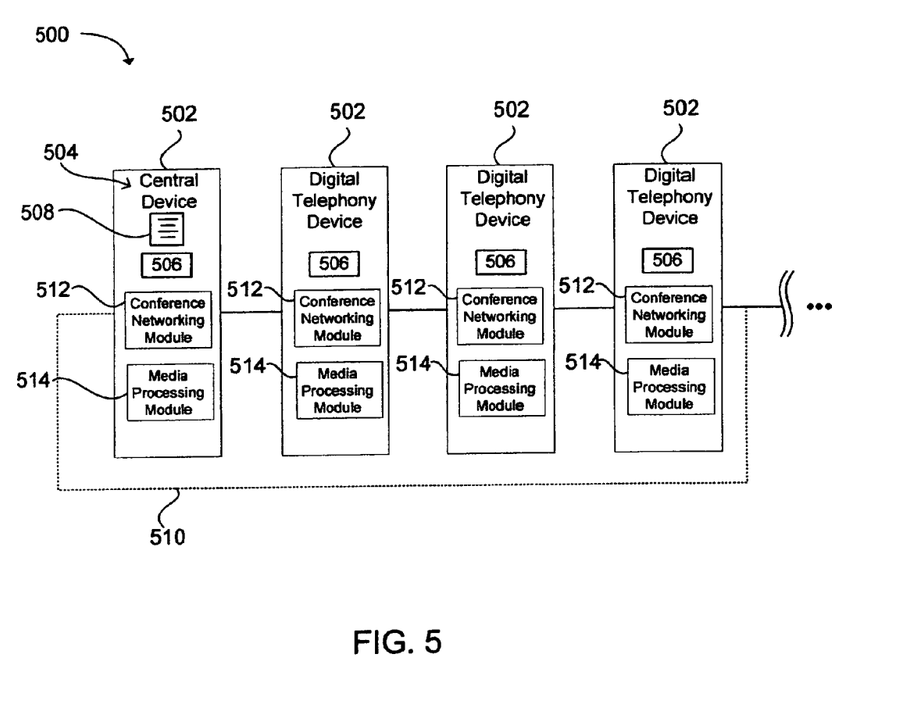
FIG. 5 is an illustration of a system for cascaded teleconferencing between digital telephony devices in accordance with an embodiment of the present invention.

A digital telephony network can include a plurality of digital telephony devices 502, as illustrated in FIG. 5. While four digital telephony devices are illustrated in FIG. 5, the network 500 can include any number of devices. The digital telephony devices may be connected via a bidirectional connection, or a unidirectional connection, as discussed above. If a unidirectional connection is used between the devices, a return loop 510 creates a cycle, as discussed with respect to FIG. 3.

To create a teleconference between multiple digital telephony devices 502 (devices) in a digital telephony network, one of the digital telephony devices in the network can be designated as the central digital telephony device 504 (central device). The central device can be provided with a list 508 of devices that are selected to be in the teleconference.

The central device 504 is typically a digital telephony device used to implement a teleconference. Thus, any device 502 in a digital telephony network can be designated as the central device. Alternatively, the central device may be different from a device used to implement the teleconference.

Figure 6:
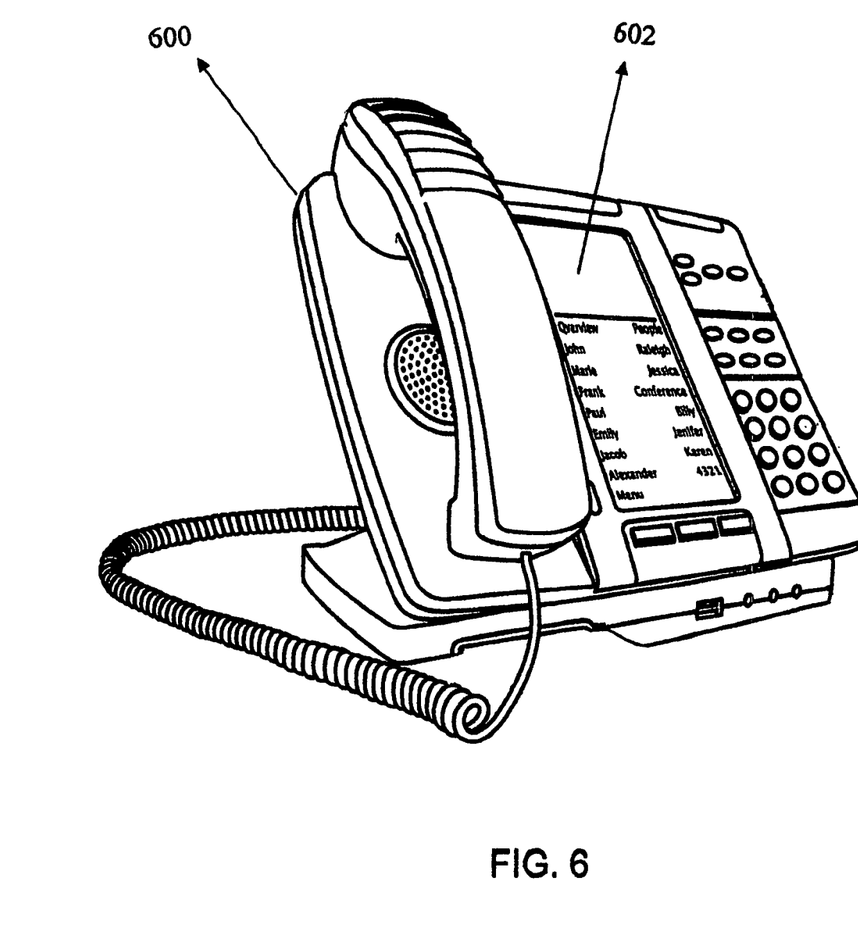
FIG. 6 is an illustration of a digital telephony device having a display screen in accordance with an embodiment of the present invention.

In one embodiment, the list 508 of devices selected to be in the teleconference can be entered using a graphical user interface. For example, an employee at a small business can use a graphical interface 602 available on the employee's digital telephony device 600, as shown in FIG. 6. The graphical interface may be accessible via a touch screen, or through buttons located adjacent to the screen. Alternatively, a graphical interface may be used that is located on a separate computing device, such as a desktop or palmtop computer that is in communication with the digital telephony device. The employee can use the graphical user interface to select the desired individuals with which to teleconference. The graphical user interface can enable the user to quickly assemble the information necessary to network the selected devices, such as the extension number of the selected devices.

Returning to FIG. 5, the central device 504 can be used to establish control sessions with each of the selected devices 502 involved the teleconference. The control sessions may be established using a suitable protocol, such as session initiation protocol (SIP). In the case of a bi-directional conference, the central device 504 can be provided with the conferencing capabilities of each of the devices selected to be in the teleconference. That is, the central device 504 is provided with the number of ports of each device 502 in the teleconference. This information may be stored in a memory 506 of the central device. Alternatively, the number of ports of each device that is selected to be in a teleconference can be obtained by querying each of the devices over the control sessions.

Using the port information, the central device 504 can build a communications network by commanding each device 502 to create media connections with other selected devices in the network. The selection of devices 502 for each node can be done simply by creating media connections between devices in the order that they are presented on the list 508 of devices selected by the user of the central device 504. However other more complicated methods may be sensitive to the distance between devices. This information can be used to make connections between devices on the same network sublet, or that are otherwise considered nearby.

The central device 504 can also be responsible for the handling of requests for removal and addition of devices. These requests can occur when an additional device is added to the teleconference, or when a member of the teleconference hangs up his or her phone, thereby eliminating the need for a connection with the member's device 502. In addition, when the teleconference is completed and all of the users have hung up their respective phones, the central device 504 can be configured to perform the final tear down of the conference, thereby eliminating the connections between the central device 504 and the selected devices 502 created to form the teleconference.

A unidirectional conference is a simple case since all devices 502 have two ports. There is no requirement to ascertain the conferencing capabilities (i.e. the number of ports) of each device. Creation of the communications network between selected devices 502 and other management functions will otherwise be the same as with the bi-directional conference described above.

In another embodiment, a conference can be created between selected devices 502 by passing the list 508 on to devices on the list as the tree is built. Each device 502 can annotate the list 508 to indicate which device(s) 502 that it is servicing. As the list 508 is passed along, it will be annotated to show all devices 502 that are currently being serviced. Additionally, for devices 502 with large fan outs, the list 508 may be passed on to the multiple devices directly connected to the current devices with the list annotated to share the remaining devices among the directly connected devices. Thus, the connection tree can be built by progressing down the list each and every branch and each device can be aware of all devices in the conference tree.

In accordance with one embodiment, a system 500 for cascaded teleconferencing between digital telephony devices is disclosed, as illustrated in FIG. 5. The system comprises a plurality of digital telephony devices 502. Each digital telephony device can include a speaker, a microphone, an input port and an output port. Each device also includes a conference networking module 512 and a media processing module 514. The conference networking module 512 is configured to establish a control session with each of the plurality of digital telephony devices to form a cascaded peer to peer network between the devices. The media processing module 514 is configured to transmit, at the output port, a sum of a local microphone signal and each conference microphone signal received at the input port from the plurality of digital telephony devices to form a cascaded teleconference signal. The cascaded teleconference signal is output to a next digital telephony device in the plurality of digital telephony devices. The speaker is operable to broadcast the conference microphone signal received at the input port of each of the plurality of digital telephony devices.

Figure 7:
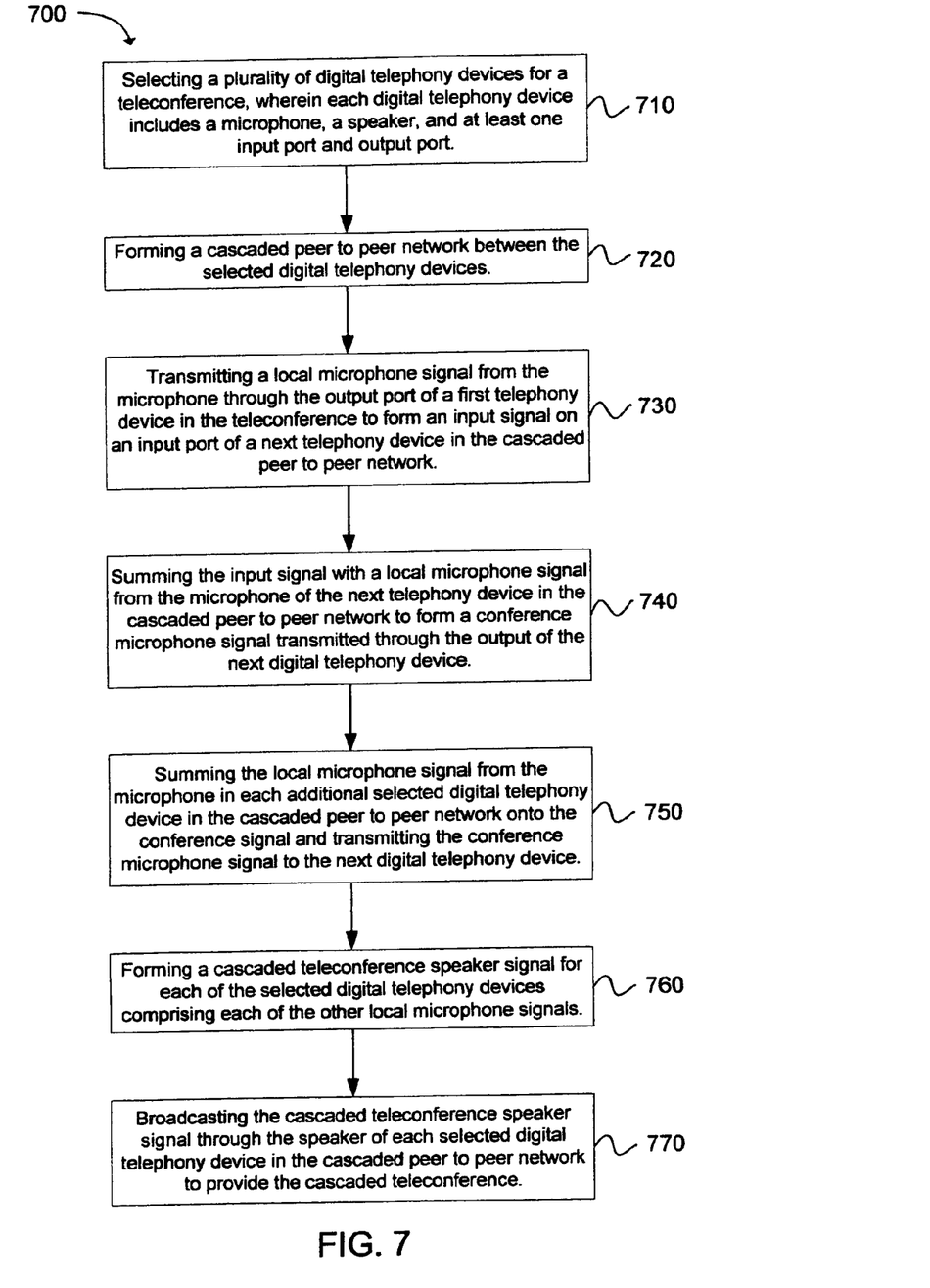
FIG. 7 is a flow chart depicting a method for forming a cascaded teleconference between digital telephony devices in accordance with an embodiment of the present invention.

In accordance with another embodiment, a method 700 for forming a cascaded teleconference between digital telephony devices is disclosed, as depicted in the flow chart of FIG. 7. The method comprises selecting 710 a plurality of digital telephony devices for a teleconference. Each digital telephony device includes a microphone, a speaker, and at least one input port and output port. A cascaded peer to peer network is formed 720 between the selected digital telephony devices. A local microphone signal is transmitted 730 from the microphone through the output port of a first telephony device in the teleconference to form an input signal on an input port of a next telephony device in the cascaded peer to peer network. The input signal is summed 740 with a local microphone signal from the microphone of the next telephony device in the cascaded peer to peer network to form a conference microphone signal transmitted through the output of the next digital telephony device. The local microphone signal from the microphone in each additional selected digital telephony device in the cascaded peer to peer network is summed 750 onto the conference signal and transmitting the conference microphone signal to the next digital telephony device. A cascaded teleconference speaker signal is formed 760 for each of the selected digital telephony devices. The cascaded teleconference speaker signal comprises each of the other local microphone signals. For example, in FIG. 1a, the cascaded teleconference speaker signal comprises the local microphone signals of devices B and C, but not the local microphone signal from device A. And finally, the cascaded teleconference speaker signal is broadcast 770 through the speaker of each selected digital telephony device in the cascaded peer to peer network to provide the cascaded teleconference.

Additional Functions

In addition to providing the ability to conduct teleconferences, a cascaded network of digital telephony devices, as illustrated in FIGS. 1a-5, can also be used to perform additional functions without the need to connect the digital telephony devices on the network to a telephony server.

Paging

For example, one additional function that can be accomplished without the need for a telephony server is paging, in which an announcement is made over multiple device speakers. Using either the unidirectional or bidirectional conferencing methods that were previously described, a conference may be set up consisting of the originating digital telephony device (i.e. the central device) and selected speakers located on other digital telephony devices located in the network.

During call setup, each digital telephony device (device) selected to receive a page can be informed that the call is a paging call. Each device can then auto answer the call and place the audio on its speaker. The audio will typically be placed on the device's conferencing (i.e. hands free) speaker. In another embodiment, a video page may be made, in which case the call can be auto answered, with the audio placed on device's conferencing speaker, and the video on the device's display screen. The audio and/or video are together referred to as media.

In contrast to a teleconference, the local microphone signal of each device will not be added to the media signal from the central device along the paging path. In addition, there is no need to send the media signal through an echo canceller since the local microphone signal is not added.

Paging may be used in an office type environment to send voice messages regarding meetings or other events. Paging can also be used in an office, factory, or hotel/motel type environment to send emergency messages, such as messages regarding evacuation of the premises. The ability to send paging messages via the digital telephony devices eliminates the need to have dedicated speakers for paging in office or hotel rooms.

Intercom

Intercom can be an important feature in a small business. Intercom is a push to talk/auto-answer feature. For example, a secretary may depress a button on her digital telephony device and have an immediate connection set up with his or her boss' digital telephony device. This may be extended so that an intercom connection can be used to interconnect multiple parties. The media connections described previously are suited to an intercom service. The feature differs from that of a teleconference at the management level in that the type of service can be identified as a call that is being set up.

Alternatively, a specialized type of service may be created and identified as an intercom call. In this case, the call may be auto answered at each selected digital telephony device to enable the secretary's audio/video message to be broadcast from the selected device(s). In addition, the local microphone (i.e. the hands free microphone) on each digital telephony device can be activated to enable the person/people at each selected digital telephony device to respond to the secretary and/or talk with the others involved in the intercom call. In this embodiment, the echo canceller is used when the digital telephony devices involved are connected via a unidirectional type connection. The local microphone signal of each digital telephony device is added to the conference microphone signal, as in a typical teleconference.

The main difference between a teleconference call and an intercom type call is the auto answer feature of the intercom type call, with the cascaded teleconference speaker signal being sent to the device's conference speaker, and the activation of the conferencing microphone (hands free microphone).

Mixed Features

With the use of a cascaded network of digital telephony devices, the operation of conferencing, intercom and paging features may be mixed to provide for novel functionality. For example, a call which originates as a paging or intercom call may be transitioned in mid-call to a conference type call. For example, in the case of an emergency, a paging announcement may be sent out to all telephones in a hotel. The media path will be set up as a paging type call. The call may be transformed to a conferencing type call by a management feature in mid-call. For example, a page can go out requesting that all emergency personnel access a telephone. This call can be auto-answered at the digital telephony device, with the audio broadcast thought the conference speaker. After the emergency personnel have picked up the call, the call can be transformed to a conference call or an intercom call by sending a control signal that transforms the devices to enable access to conference features such as the ability of multiple parties to speak using multiple devices, the addition of new parties, and so forth.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for forming a cascaded teleconference between digital telephony devices, comprising:
    selecting a plurality of digital telephony devices for a teleconference, wherein each digital telephony device includes a microphone, a speaker, and at feast one input port and output port;
    determining a number of ports available in each of the plurality of digital telephony devices selected for the teleconference and storing information related to the number of ports available in each of the plurality of digital telephony devices in a digital memory located in a central device;
    forming a cascaded peer to peer network between the selected digital telephony devices and selecting one of the plurality of digital telephony devices as the central digital telephony device configured to establish a control session with each of the plurality of digital telephony devices through a predetermined protocol;
    transmitting a local microphone signal from the microphone through the output port of a first telephony device in the teleconference to form an input signal on an input port of a next telephony device in the cascaded peer to peer network;
    summing the input signal with a local microphone signal from the microphone of the next telephony device in the cascaded peer to peer network to form a conference microphone signal transmitted through the output of the next digital telephony device;
    summing the local microphone signal from the microphone in each additional selected digital telephony device in the cascaded peer to peer network onto the conference microphone signal and transmitting the conference microphone signal to the next digital telephony device;
    forming a cascaded teleconference speaker signal for each of the selected digital telephony devices comprising each of the other local microphone signals; and
    broadcasting the cascaded teleconference speaker signal through the speaker of each selected digital telephony device in the cascaded peer to peer network to provide the cascaded teleconference.

2. A method as in claim 1, wherein determining the number of ports available further comprises querying each of the plurality of digital telephony devices to determine the number of ports in each of the plurality of digital telephony devices.

3. A method as in claim 1, further comprising constructing a conferencing tree using the central digital telephony device, wherein the tree is constructed based on the number of ports available in each of the plurality of digital telephony devices.

4. A method as in claim 1, wherein forming the cascaded peer to peer network further comprises adding additionally selected digital telephony devices to the cascaded peer to peer network using the central digital telephony device.

5. A method as in claim 1, wherein forming the cascaded peer to peer network further comprises removing desired digital telephony devices from the cascaded peer to peer network using the central digital telephony device when desired digital telephony devices are no longer needed.

6. A method as in claim 1, further comprising dismantling the cascaded peer to peer network when the cascaded teleconference has ended using the central digital telephony device.

7. A method as in claim 1, wherein forming the cascaded peer to peer network further comprises selecting one of the plurality of digital telephony devices as a central digital telephony device configured to establish a control session with each of the plurality of digital telephony devices using session initiation protocol (SIP).

8. A method as in claim 1, wherein forming the cascaded peer to peer network further comprises creating a list of devices selected to be in the cascaded teleconference, wherein the list is passed to each device on the list and the list is annotated by the selected devices to show each device that is being serviced.

9. A method as in claim 1, wherein forming the cascaded teleconference speaker signal further comprises summing the conference microphone signal received at each input port at each of the selected digital telephony devices when the plurality of digital telephony devices are connected with a bi-directional connection.

10. A method as in claim 1, wherein forming the cascaded teleconference speaker signal further comprises removing the local microphone signal from the conference microphone signal at each of the selected digital telephony devices when the plurality of digital telephony devices are connected with a unidirectional connection.

11. A method as in claim 1, wherein forming the cascaded teleconference speaker signal further comprises removing the local microphone signal from the conference microphone signal at each of the selected digital telephony devices by subtracting a delayed digital sample of the local microphone signal from the conference microphone signal wherein the delay was created using a FIFO buffer.

12. A method as in claim 1, further comprising sending an auto answer signal from the a central digital telephony device to the plurality of digital telephony devices through the predetermined protocol to enable the plurality of digital telephony devices in the cascaded teleconference to be used for at least one of an intercom and paging.

13. A method as in claim 1, further comprising sending a control signal to each of the selected digital telephony devices to identify the conference microphone signal as one of a teleconference, a page, or an intercom message.

* * * * *